United States Patent
Evans et al.

(10) Patent No.: US 8,169,337 B2
(45) Date of Patent: May 1, 2012

(54) DOWNHOLE COMMUNICATIONS MODULE

(75) Inventors: Randy L. Evans, Sugar Land, TX (US);
Freeman L. Hill, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1009 days.

(21) Appl. No.: 11/840,725

(22) Filed: Aug. 17, 2007

(65) Prior Publication Data

US 2009/0045975 A1 Feb. 19, 2009

(51) Int. Cl.
*G01V 3/00* (2006.01)
*E21B 47/00* (2012.01)

(52) U.S. Cl. .................. 340/853.1; 166/250.01
(58) Field of Classification Search .............. 340/853
See application file for complete search history.

(56) References Cited

U.S. PATENT DOCUMENTS

| | | | |
|---|---|---|---|
| 3,918,537 A | 11/1975 | Heilhecker | |
| 4,670,862 A | 6/1987 | Staron et al. | |
| 4,686,653 A * | 8/1987 | Staron et al. | ............... 340/856.2 |
| 5,358,035 A * | 10/1994 | Grudzinski | ..................... 166/53 |
| 5,504,479 A | 4/1996 | Doyle et al. | |
| 5,521,337 A | 5/1996 | Chen et al. | |
| 6,112,809 A | 9/2000 | Angle | |
| 6,421,298 B1 | 7/2002 | Beattie et al. | |
| 6,799,633 B2 * | 10/2004 | McGregor | ............... 166/250.01 |
| 6,845,819 B2 * | 1/2005 | Barrett et al. | ............ 166/250.01 |
| 6,868,906 B1 * | 3/2005 | Vail et al. | .................. 166/250.01 |
| 6,953,094 B2 * | 10/2005 | Ross et al. | ..................... 166/381 |
| 7,048,089 B2 * | 5/2006 | West et al. | ..................... 181/105 |
| 2002/0050930 A1 * | 5/2002 | Thomeer et al. | ........... 340/853.3 |
| 2004/0257241 A1 * | 12/2004 | Menger | ..................... 340/854.3 |
| 2005/0156754 A1 | 7/2005 | Rodney | |

FOREIGN PATENT DOCUMENTS

| | | |
|---|---|---|
| WO | 03053603 A2 | 7/2003 |
| WO | 03089760 A1 | 10/2003 |

* cited by examiner

*Primary Examiner* — Brian Zimmerman
*Assistant Examiner* — Jerold Murphy
(74) *Attorney, Agent, or Firm* — Bracewell & Giuliani LLP

(57) ABSTRACT

A communication module for use in wellbore logging operations. The module is attachable around a wireline, slickline, tubing or coiled tubing having a logging tool on its end. The module includes a drive means for transporting it down the line, a controller for controlling its operation, and communications for communicating with the logging tool. Communication between the module and the logging tool includes the transfer of data and operational instructions.

10 Claims, 3 Drawing Sheets

DOWNHOLE COMMUNICATIONS MODULE

BACKGROUND OF THE INVENTION

1. Field of the Invention

The disclosure herein relates generally to the field of oil and gas production. More specifically, the present disclosure relates to a device for communicating within a subterranean wellbore. Yet more specifically, the present disclosure concerns a communication device that is deployable on a line or tubing and communicates with a downhole tool.

2. Description of Related Art

Well logging tools, used to interrogate a subterranean formation adjacent a wellbore, are typically disposed within a wellbore on a line. As these tools are drawn up the wellbore, devices within the logging tools scan, or interrogate, the surrounding formation and record data based on their scan. The data can either be recorded onboard the logging tool or transmitted up the line to the surface. The line, or conveyance member, typically comprises a wireline; other conveyance means are also typically used, such as an armored cable, slickline, tubing, and coiled tubing.

FIG. 1 provides one example of a logging operation. A surface truck 12 is used for controlling the lowering and raising of a logging tool 20 within the wellbore 5. The logging tool 20 is shown adjacent a formation 7 and conducting logging operations to obtain information regarding the formation. The raising lowering means 14 shows an armored cable extending from a spool on the surface truck 12. The wireline is strung through a wellhead 18 across a derrick 16. Logging tools known in the art can provide many different types of measurements of the properties of the formation 7. These measurements include electrical resistivity, natural gamma-ray radiation intensity, bulk density, hydrogen nucleus concentration and acoustic travel time. Logging tools can also provide information with regard to a casing disposed in a wellbore 5 and the bond between the casing and the surrounding formation. Other logging tools, referred to herein as imaging tools, tale sequential measurements along the wellbore at axial and radial spacings at very discrete measurements.

As noted above, the data recorded by the logging tool can either be recorded on the tool or transferred uphole. Often the data is digitized at some point prior to it being analyzed in order to obtain information regarding the formation 7. In some instances, the data is transmitted via means other than a wireline, i.e., such as telemetry. Double headed arrow 22 represents the general transfer of data between the logging tool 20 and the surface. Due to the large amount of data recorded by logging tools 20, problems exist in transferring this data. Often times, the required signal data transmission rates exceed the signal carrying capability of the line attached to a logging tool 20. This is especially true when dealing with imaging tools. Other forms of transmitting data uphole from a logging tool exist. These include mud pulse telemetry as well as other seismic ways of transmitting data.

BRIEF SUMMARY OF THE INVENTION

The present disclosure includes a method of communicating in a wellbore comprising disposing a downhole tool within a wellbore on a conveyance member, providing instructions to a communication device to travel down the conveyance member proximate to the downhole tool and communicate with the downhole tool, coupling the communication device on the conveyance member, and initiating operation of the communication device to perform its instructions. The conveyance member may be one of a wireline, slickline, tubing, and coiled tubing. Communication between the communication device and the downhole tool includes a transfer of wellbore data from the downhole tool to the communication device, instructions from the communications device to the downhole tool, and instructions from the downhole tool to the communications device. Communication between the communications device and the downhole tool may be by radio waves, direct transmission through a data conductor, and may be analog or digital.

Also disclosed herein is a self propelled communication device for traversing a wellbore conveyance member. The device comprises, a programmable controller, a drive system couplable to the wellbore conveyance member, a power source, and a communications module. In one embodiment the drive system comprises a downhole tractor. Additionally, the power source may comprise a battery. The communications module is configured to communicate with a downhole tool by one of radio waves, direct contact, and a wet connect, and the communication can be in analog or digital form. The conveyance member may be a wireline, slickline, tubing, or coiled tubing.

DETAILED DESCRIPTION OF THE INVENTION

Disclosed herein is a device and method for transferring data within a wellbore to the surface. The method includes disposing a downhole tool within a wellbore, wherein the tool is suspended from a conveyance member. A self propelled and self contained communication device can then be coupled onto the conveyance member and surface and lowered by its own power, either in contact or approximate to the downhole tool wherein communication between the module and the downhole tool may take place. The module can be programmed to activate its drive means and return to the surface at the completion of the data transfer. Upon reaching the surface any data stored in the module from the downhole tool may be retrieved and analyzed.

Figure 2:
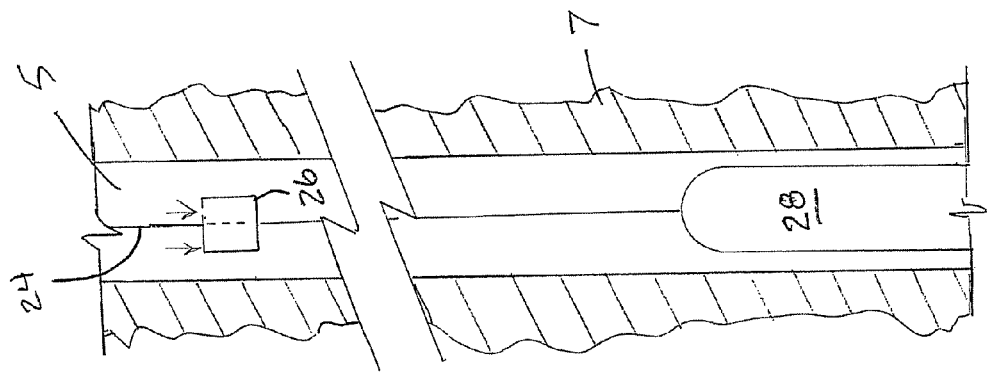
FIG. 2 portrays in partial cut-away view an embodiment of a communications module and downhole tool disposed in a wellbore.
Figure 1:
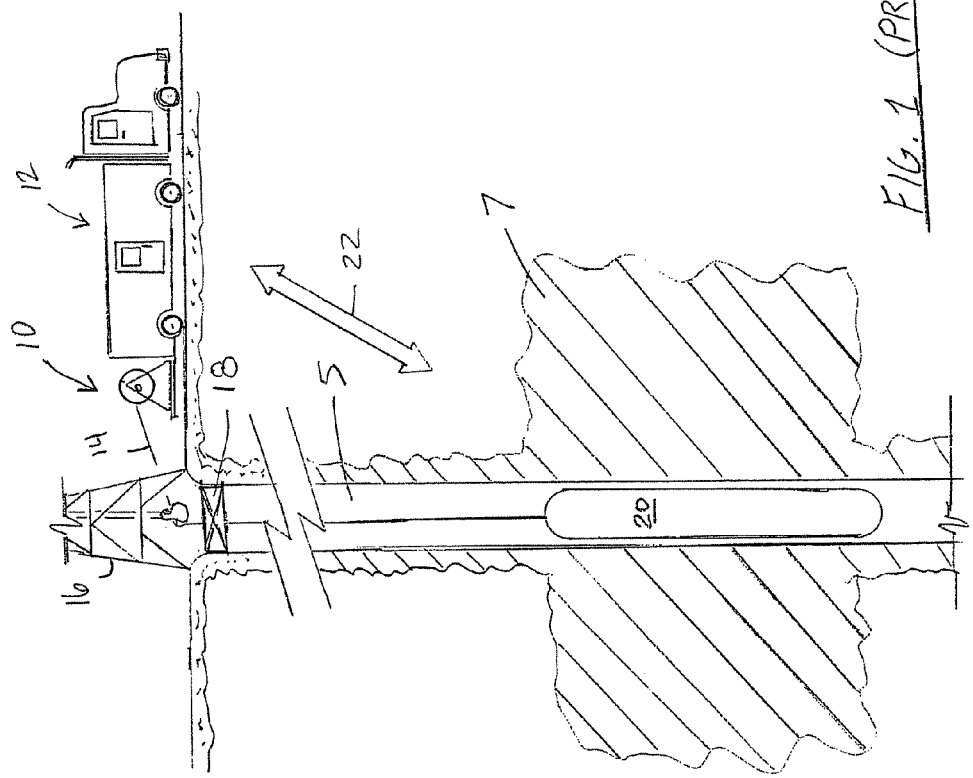
FIG. 1 illustrates, in partial cut-away view, a downhole tool in communication with the surface.

FIG. 2 is a side view taken through a cross section of a wellbore 5 and surrounding formation 7. A downhole tool 28 is shown disposed in the wellbore 5 on its upper end to a conveyance member 24. The conveyance member may be any one of a wireline, slickline, tubing, as well as coiled tubing. Although not shown, the upper end of the conveyance member is connected on surface and having a raising lowering means, such as the surface truck configuration 12 of FIG. 1. Also shown in FIG. 2 is a communications module 26 disposed on the conveyance member 24 and traveling downward towards the downhole tool 28.

Figure 3:
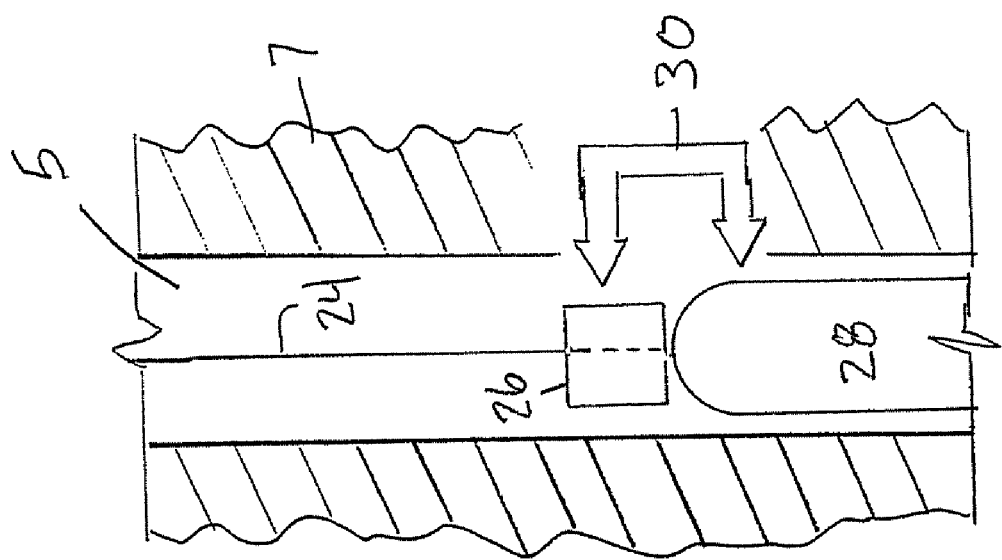
FIG. 3 schematically demonstrates communication between a communications module and downhole tool.

In the embodiment of FIG. 3, the communications module is disposed adjacent the downhole tool 28. Upon reaching this point, communication between the communication device 26 and downhole tool 28 can begin. Double headed arrow 30 illustrates a communication pathway between these two devices. Thus, communication can be from the communications device 26 to the downhole tool 28, from the downhole tool 28 to the communications device 26, or two way communication between these two devices. In one embodiment, communication between the communications device 26 and the downhole tool 28 comprises a data signal emitted from the device 26 received by the downhole tool 28. The downhole tool 28 is programmable such that upon receiving the data signal it will take a pre-programmed corresponding action. For example, based on receiving the signal, the downhole tool 28 may cease its operations, undertake another downhole operation, alter its operations, or change its operations altogether. The communication can also be a transfer of data from the downhole tool 28 to the communications device 26, wherein the data may comprise information the downhole tool 28 has obtained by interrogating the adjacent formation 7 and/or wellbore 5.

Other communication from the downhole tool to the communications module may include a termination signal indicating the end of data transmission and/or a request the communications device 26 return to surface. Other forms of communication between these two devices may include activating another device based off results from a depth correlation device for such commands as initiating a pulsed neutron tool or other activities. This can be done by retrieving the data from the communication device by it coming back uphole and then sending the device back to the tool downhole to give it further information or instructions. It can also be done by software that can compare patterns of data, and when depth data patterns match, the device may give new commands to the downhole tool. It should be pointed out that the method and device disclosed herein is not limited to use with a single downhole tool, but can be used with more than one downhole tool, including multiple tools comprising a tool string. Also, the communication device may receive a key signal from the downhole tool which may sequence information and commands based on preplanned logical command instructions list.

Figure 4:
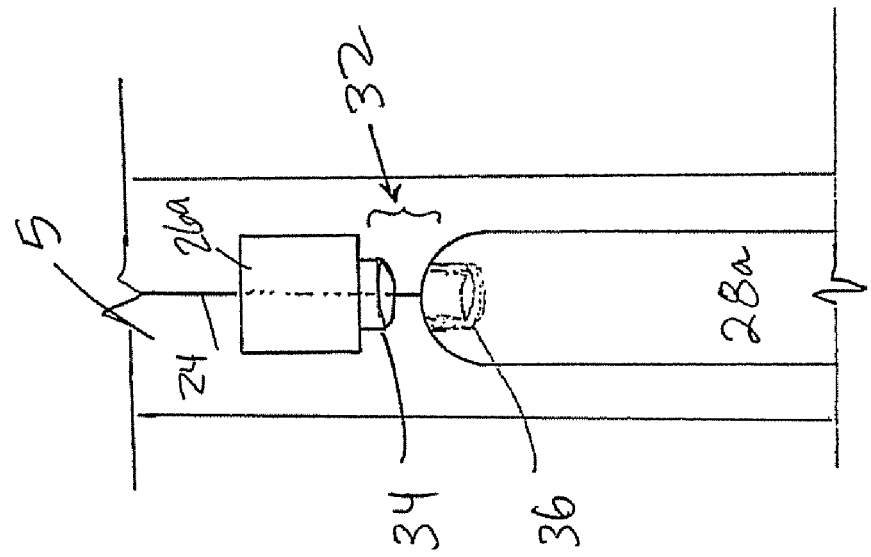
FIG. 4. shows in side perspective view, a communications module and downhole tool with connection fittings.

Communication between the module 26 and the downhole tool 28 may be in the form of radio waves transmitted and received by both the communications device 26 and the downhole tool 28. Optionally, a direct connection between these two devices may take place and data through a conductor may occur. One example of direct coupling is shown in a side view of FIG. 4. Here, included with the communications device 26a and the downhole tool 28a is a connector 32 comprising a male connector 34 and a female connector 36. The male connector is shown disposed on the communications device 26a extending downward towards the downhole tool. A corresponding female receptacle is formed in the downhole tool 28a to receive the male connector portion of the connection 32. Thus, once coupled, direct communication between these devices may occur through the connector. One example of a suitable connection is what is commonly referred to as a "wet connect".

After receiving data from the downhole tool 28, the device 26 can be instructed to return to the wellbore surface. The instructions can be stored within, or from direction received by the downhole tool 28. Once reaching the surface, data stored within the communications device 26 is transferred to a surface truck or other command facility for data analysis. The device 26 is then redeployable within the wellbore to retrieve additional data from the downhole tool 28. The "ferrying" of data by the device 26 can take place the entire time the downhole tool 28 is disposed within the wellbore. This reduces the amount of data storage space required by the downhole tool 28.

Figure 5:
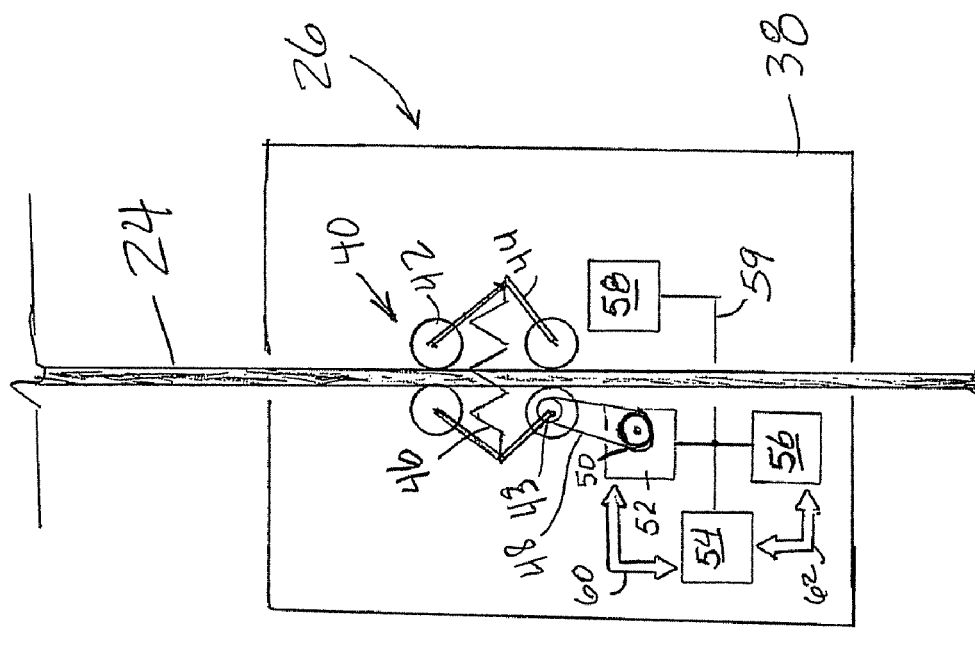
FIG. 5 is a schematic of a communications module and its components.

A schematic view of one embodiment of a communication device 26 is shown in FIG. 5. The device 26 includes a housing 38, a drive system 40, a motor 52, a controller 54, a communications module 56, and power source 58. The drive system 40 comprises wheels 42 held in close contact with the conveyance member 24. The wheels are secured to a frame 44 on their respective axes. A spring 46 is shown providing a force used to frictionally couple the wheels 42 to the conveyance member 24. However, it should be pointed out that any number of drive systems may be employed with the present device. It is only necessary that a drive system be used for conveying the device 26 upward and/or downward along any type of conveyance member. In one embodiment, motive force is provided to one of the wheels by a belt and pulley system coupling the wheel with the motor 52. With reference to FIG. 5 the belt and pulley system comprises a pulley 50 having a belt 48 mechanically coupling the pulley to a corresponding wheel pulley 43. Operation of the motor in either direction can therefore propel the device 26 either upward or downward within a wellbore on the conveyance member 24. Having its own drive or propulsion system provides a self-propelled capability that is but one advantage of the present device. Being self contained also provides advantages in that no external devices or attachments, other than programming instructions, are required to operate the device. Accordingly the use of tethers or other umbilicals are unnecessary for function of the communications device 26.

The device 26 may be coupled onto the conveyance member 24 in any number of ways. For example, the device 26 may be a unibody construction with a vertical aperture passing therethrough with the conveyance member 24 threaded through the device 26. Additionally, in another embodiment, the device 26 may be comprised of two or more segments so it could be opened and then latched around the conveyance member.

Energy for driving the motor is provided by the power source 58 via a connecting line 59. The power source may comprise an onboard battery. Optionally, other power sources may be used wherein power is retrieved from some external means such as through the conveyance member and possibly through an inductance process. The power source 58 also provides energy for the controller 54 and the communications module 56.

The controller 54 comprises components for the storage of programmable instructions and data received or sent, as well as processors for acting on the stored data and providing controlling commands to other components within the device 26. For example, instructions programmed into the controller 54 are acted on by the corresponding processor to instruct the module to traverse its way downward the conveyance member 24 at a preselected time. Moreover, instructions for communication between the communication device 26 and a corresponding downhole tool may also be stored within the controller where they are later executed to control communications exchange between the device 26 and a downhole tool. Commands for controlling the motor 52 by the controller 54 are illustrated by the double headed arrow 60. This illustrates how the controller provides information to the motor and information about the motor, i.e., revolutions per minute, power usage, and whether or not the motor has stopped, can be relayed to the controller for particular decision making operations. One example of a suitable controller is an information handling device.

Also operatively coupled to the controller 54 is the communications module 56. In this embodiment, double headed arrow 62 represents communication between the controller 54 and the communications module 56. Thus, through its communication with the communications module 56, the controller may recognize when the device 26 is proximate to the downhole tool. The controller 54 may then instruct the communications module 56 to transmit a signal to the downhole tool 28 indicating it is ready to receive data from the downhole tool 28. Also, by virtue of double headed arrow 62, information from the communications module 56, that is received from the downhole tool 28, may be relayed to the controller 54. This information may include communications commands from the downhole tool such as end of data to be transmitted, possibly a command for the device 26 to return uphole, activating a ballistic device, reset, turn on off tools, go into safe mode, and other such commands.

While this invention has been shown in only one of its forms, it should be apparent to those skilled in the art that it is not so limited but is susceptible to various changes without departing from the spirit and scope of the invention. In the drawings and specification, there have been disclosed illustrative embodiments of the invention and, although specific terms are employed, they are used in a generic and descriptive sense only and not for the purpose of limitation, the scope of the invention being set forth in the following claims.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, a braking device may be included with the communications device 26 for slowing its descent along the conveyance member. Additionally, it may be configured to "free fall" to the downhole tool, then inflate an attached bladder with compressed gas to raise it to surface. The drive system may be what is referred to as a "tractor" and would have belt like treads in lieu of or addition to wheels. These and other similar modifications will readily suggest themselves to those skilled in the art, and are intended to be encompassed within the spirit of the present invention disclosed herein and the scope of the appended claims.

What is claimed is:

1. A method of communicating in a wellbore comprising:
    disposing a downhole tool within a wellbore on a conveyance member;
    providing a communication device havings drive system that includes wheels;
    deploying the communication device on the conveyance member;
    sending the communication device downhole along the outer surface of the conveyance member towards the downhole tool by rotating the wheels while the wheels are in contact with the outer surface of the conveyance member;
    communicating between the downhole tool and the communication device; and
    conducting operations with the downhole tool using communication transferred from the communication device.

2. The method of claim 1, wherein the downhole tool response is selected from the list consisting of communicating with the communication device, initiating operations, ceasing operations, altering operations, and changing operations.

3. The method of claim 1, wherein the step of conducting operations with the downhole tool is selected from the list consisting of wellbore logging, wellbore perforating, wellbore remediation, and wellbore intervention services.

4. The method of claim 1, further comprising: (a) returning the communication device to the surface; (b) transferring data from the communication device for data analysis, and (c) redeploying the communication device into the wellbore, wherein as steps (a)-(c) are performed, the downhole tool remains downhole as the communication device travels along a length of the conveyance member.

5. The method of claim 4, further comprising repeating steps (a)-(c).

6. The method of claim 1, wherein the downhole tool is a pulsed neutron tool.

7. The method of claim 1 wherein communication between the communication device and the downhole tool is selected from the list consisting of downhole data, a command for the communication device to return to the surface and a data signal so that the downhole tool will take a pre-programmed action.

8. The method of claim 1, wherein the step of transferring communication between the downhole tool and the communication device comprises a method selected from the list consisting of providing a direct connection between the communication device and downhole tool and transmitting and/or receiving radio waves.

9. A wellbore interrogation system comprising: a wellbore logging tool disposed in a wellbore on a wellbore conveyance member;
    a communication device having a drive system and a communications module that is selectively in communication with the wellbore logging tool; and
    a command facility at the wellbore surface in communication with the communication device so that when the drive system is mounted on the conveyance member, activating the drive system moves the communication device between an entrance of the wellbore and the wellbore logging tool, wherein the drive system comprises wheels that engage an outer surface of the conveyance member and a motor for rotating the wheels.

10. A communication device for use in a wellbore comprising:
    a coupling selectively attachable to an outer surface of a conveyance member used for deploying a downhole tool in the wellbore;
    a communication device in selective communication with a controller provided in the downhole tool; and
    a drive system having a motor and wheels for selectively moving the communication device between an opening of the wellbore and to the downhole tool when in the wellbore.

* * * * *